United States Patent [19]

Gasbarro

[11] Patent Number: 4,829,682
[45] Date of Patent: * May 16, 1989

[54] SANDAL SOLE

[76] Inventor: Mark A. Gasbarro, 67 June St., Leominster, Mass. 01453

[*] Notice: The portion of the term of this patent subsequent to Jun. 28, 2005 has been disclaimed.

[21] Appl. No.: 183,594

[22] Filed: Apr. 19, 1988

Related U.S. Application Data

[63] Continuation of Ser. No. 43,090, Apr. 27, 1987.

[51] Int. Cl.$^4$ .............................................. A43B 13/20
[52] U.S. Cl. ........................................... 36/29; 36/11.5
[58] Field of Search .................. 36/11.5, 28, 29, 30 R

[56] References Cited

U.S. PATENT DOCUMENTS

| | | | |
|---|---|---|---|
| 2,507,120 | 5/1950 | Shapiro | 36/11.5 |
| 2,981,010 | 4/1961 | Aaskov | 36/29 X |
| 3,160,963 | 12/1964 | Aaskov | 36/29 X |
| 3,608,215 | 9/1971 | Fukuoka | 36/29 |
| 4,012,854 | 3/1977 | Berend et al. | 36/29 |
| 4,106,222 | 8/1978 | Houck | 36/11.5 X |
| 4,217,705 | 8/1980 | Donzis | 36/29 |
| 4,657,716 | 4/1987 | Schmidt | 36/29 X |
| 4,670,995 | 6/1987 | Huang | 36/29 |
| 4,686,781 | 8/1987 | Burg | 36/11.5 X |

Primary Examiner—Donald Watkins
Attorney, Agent, or Firm—Blodgett & Blodgett

[57] ABSTRACT

Sandal having a hollow sole containing air under slight pressure made by blow molding with a blow pipe having a pointed conical terminal providing a small entrance opening which is eventually sealed.

4 Claims, 4 Drawing Sheets

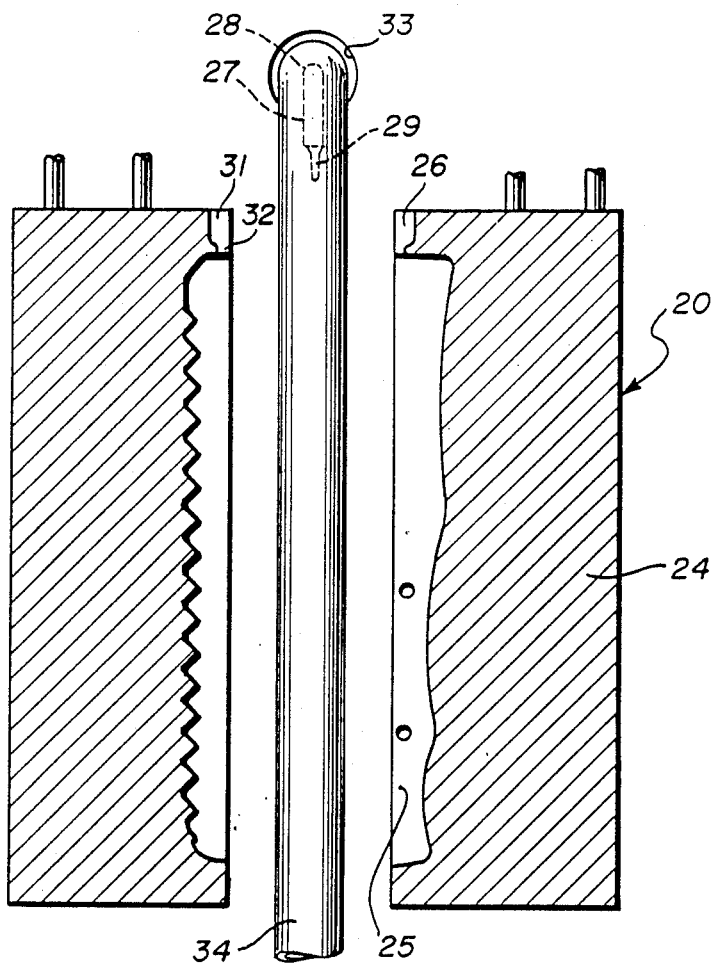
FIG. 6
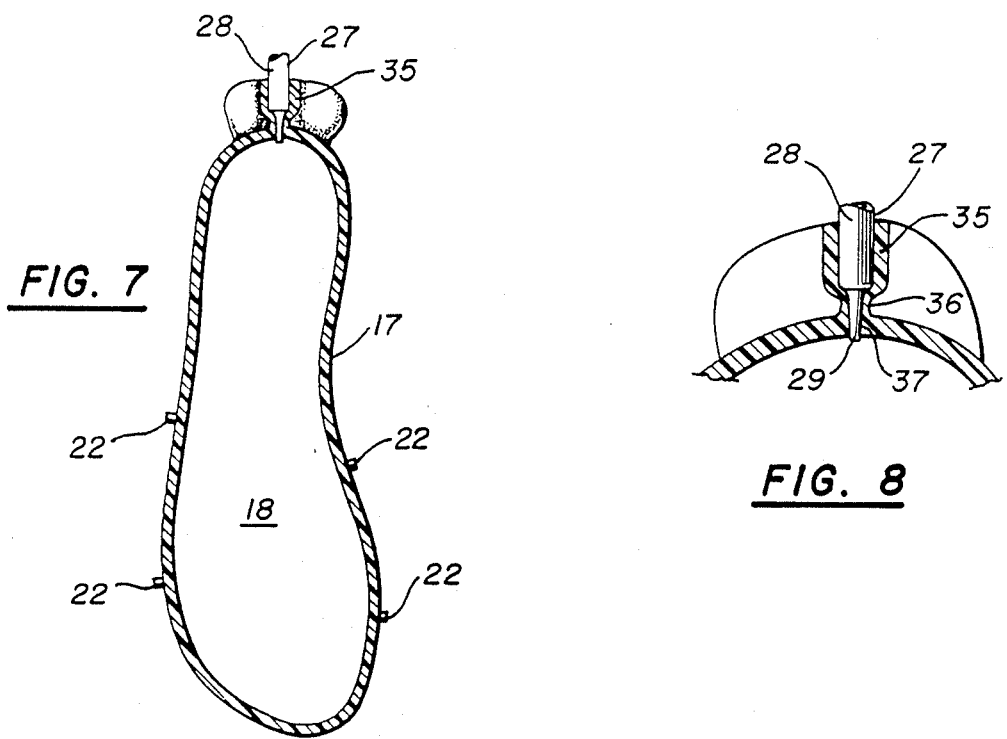
FIG. 7
FIG. 8

SANDAL SOLE

This is a continuation of co-pending application Ser. No. 43,090 filed on Apr. 27, 1987.

BACKGROUND OF THE INVENTION

In the design and construction of sandals for informal wear, it is common practice to use various kinds of material to give a soft, comfortable feel to the sandal when worn. In the past, the soles of such sandals have been made of foamed plastic, of wood, and of all types of available materials. Most of these materials, however, have had draw-backs. In the case of wood, for instance, the sandal becomes fairly heavy is easily destroyed by exposure to weather and salt water; furthermore, it is expensive to manufacture. Foamed plastic, on the other hand, is easily made dirty and absorbs perspiration; furthermore, it has a tendency to remain wet after exposure to water. These and other difficulties experienced with the prior art devices have been obviated in a novel manner by the present invention.

It is, therefore, an outstanding object of the invention to provide a sandal having a shape which conforms to the human foot and has a spring-like feel while walking.

Another object of this invention is the provision of a sandal which is easily dried when exposed to water and is easily kept clean due to having an impervious surface.

A further object of the present invention is the provision of a sandal in the form of a hollow plastic element which is simple in construction, which is inexpensive to manufacture from readily-obtainable materials, and which is capable of a long-life of useful service with a minimum of care.

It is another object of the instant invention to provide a sandal having a hollow plastic whose color can be easily selected and changed during manufacture.

A still further object of the invention is the provision of an apparatus and method for forming a sandal having a hollow sole and by which is possible to manufacture the sole with a slight positive air pressure within.

SUMMARY OF THE INVENTION

In general the present invention consists of a sandal or the like having a lower sole element formed with ground-gripping protuberances and an upper sole element formed with foot-engaging depressions. An intermediate sole element joins the outer peripheries of the upper and lower sole elements to hold them in spaced, parallel relationship, the sole elements defining an interior cavity containing gas under pressure.

More specifically the intermediate sole element is formed with upper and lower parts joined to form a bellows-like structure, Strap pins are provided externally on the intermediate sole portion. The sole elements are formed of an elastomer polymer by the blow molding process.

BRIEF DESCRIPTION OF THE DRAWINGS

FIG. 6 is a vertical sectional view of apparatus for forming the sandal, FIG. 7 is a vertical sectional view of the sole as it appears during manufacture, FIG. 8 is an enlarged sectional view of the sole shown in FIG. 7.

DESCRIPTION OF THE PREFERRED EMBODIMENT

Figure 1:
FIG. 1 is a perspective view of a pair of sandals incorporating the principles of the present invention.
Figure 2:
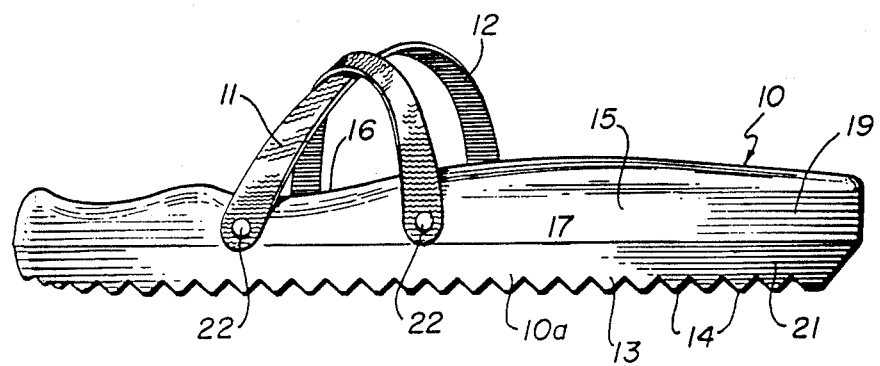
FIG. 2 is a front elevational view of a sandal sole.
Figure 3:
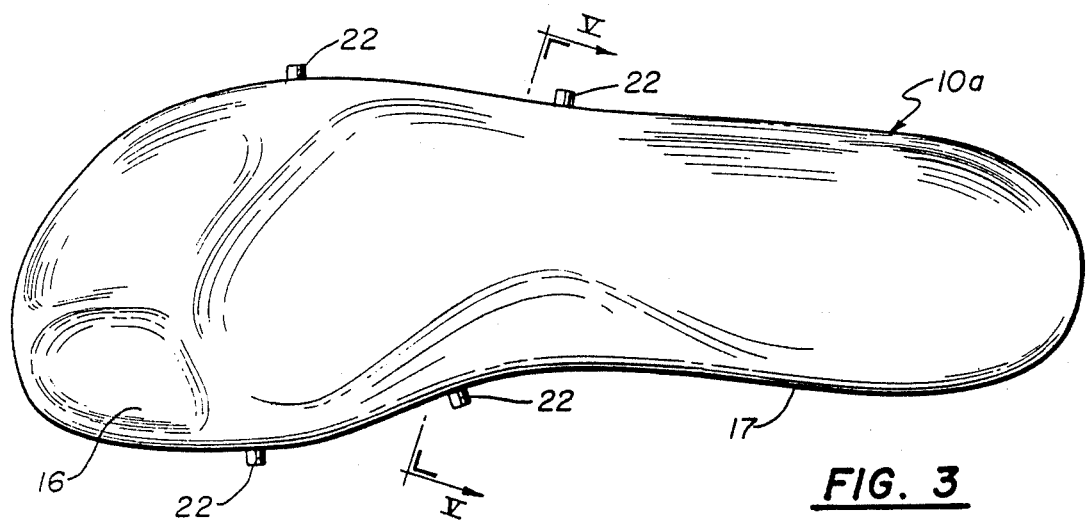
FIG. 3 is a top plan view of the sole.
Figure 4:
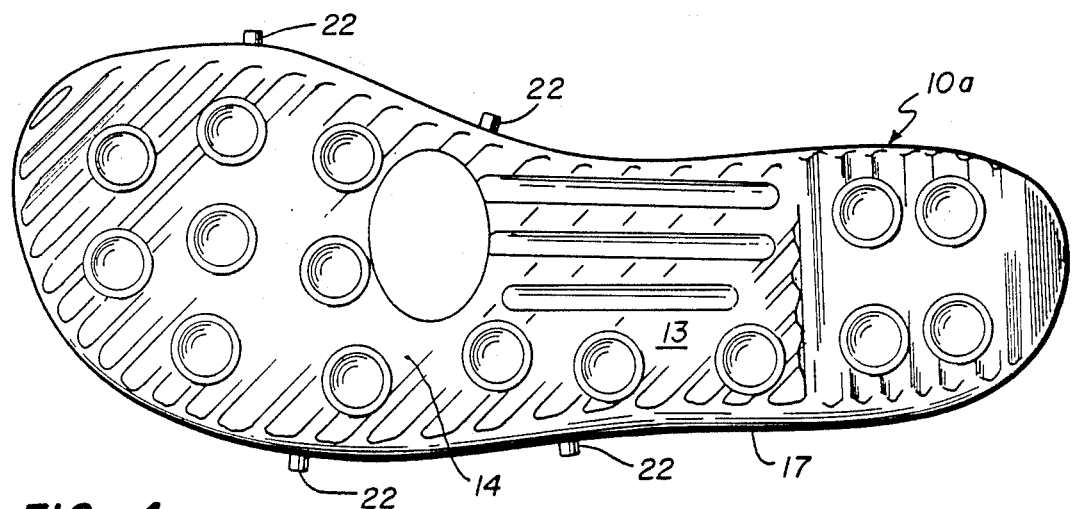
FIG. 4 is a bottom plan view of the sole.
Figure 5:
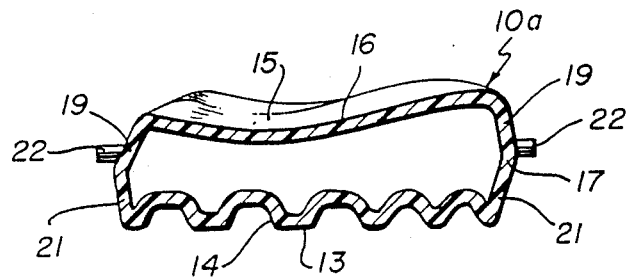
FIG. 5 is a vertical sectional view of the sole, taken on the line V—V FIG. 3.

Referring first to FIG. 1, which best shows the general features of the invention, it can be seen that the sandal, indicated generally by the reference numeral 10, is shown as having a sole 10a to which are attached straps 11 and 12.

As is evident in FIGS. 2, 3, 4 and 5, the sandal sole 10a is provided with a lower sole element 13 which is provided with a pattern of protuberances 14 for gripping the ground. The sole is also provided with an upper sole element 15 which is formed with foot-engaging depressions 16 and is generally shaped to conform to the shape of the human foot.

An intermediate sole element 17 joins the outer peripheries of the upper sole element 15 and the lower sole element 13 to locate them in a generally spaced, parallel relationship; the sole elements define an interior cavity 18 containing air under a slight pressure.

In the preferred embodiment, the sole elements are formed of an elastomer polymer and the entire sole is formed by the blow-molding process, wherein gas under pressure is introduced into the cavity 18 during the blow-molding process. As is evident in FIG. 5, the intermediate sole element 17 is formed with upper and lower parts 19 and 21 that are joined to form a bellows-like structure. Strap pins 22 are integrally formed on the upper part 19.

Referring now to FIG. 6, which shows the apparatus 20 for forming the sandal sole 10a by blow-molding. The apparatus consists of a mold 24 that is formed with a cavity 25 that conforms to the exterior of the shape of the sole of the sandal. A passage 26 extends from the cavity 25 to the exterior of the mold adjacent an extruder 33. Extending from the extruder is a blowpipe 27 having an elongated tubular main portion 28 and a pointed terminal portion 29 which is of frusto-conical shape. The passage 26 is formed with an outer portion 31 that is sized and shaped to receive the main portion 28 of the blowpipe. It is also formed with an inner portion 32 of reduced cross-section to receive the terminal portion 29 of the blowpipe.

The extruder 33 is provided to form a parison 34 which enters the cavity 25 of the mold 24 and is expanded to fill the cavity by pressure air introduced through the blowpipe. The blowpipe 27 and the passage 26 act to form a removable flash 35 (see FIGS. 7 and 8) formed exteriorly of the sandal. The flash has a reduced portion 36 with a small aperture 37, the reduced portion facilitating the removal of the flash.

The method of forming the sole 10a of the sandal comprises, therefore, the steps of extruding a parison 34 and introducing the parison into the cavity 25 of the mold 24. The blowpipe 27 is then introduced with its pointed terminal portion 29 lying within the reduced portion 32 of the aperture 26. Pressure air is introduced through the blowpipe into the parison in the vicinity of the cavity 25 to expand the parison outwardly to conform to the shape of the cavity. During the process, the sole is formed with a disposable flash 35 which is intended to be removed. This flash has the above-described reduced portion 36, as is evident in FIGS. 7 and 8, the reduced portion having a small apertures 37 formed where the terminal portion 29 of the blowpipe extends through into the cavity 18. Finally, the flash 35 is removed by breaking it off at the said reduced portion 36. According to the last step, a hot iron is applied to the sole in the vicinity of the aperture 37 to melt the plastic and to close the aperture, thus trapping pressure air in the hollow interior cavity 18.

The operation and the advantages of the present invention will now be readily understood in view of the above discussion. When the sandal 10 is applied to the human foot and used as a shoe the pressure air in the interior provides a cushioning effect that is very pleasing. The air acts as a soft spring and prevents damage to the foot when walking on rough ground. It also tends to minimize the problem encountered when walking in soft sand. Because the sandal is formed of a plastic or polymer, it has a tendency not to be subject to corrosion or deterioration when exposed to salt water (or to any water for that matter). Furthermore, any exterior dirt is easily removed by washing, as is perspiration or any other contaminating substance. This makes the sandal particularly useful at the seashore where sticking sand and salt water would tend to accumulate on other types of materials. In the manufacturing process the change from one color to another is a simple matter, so that a wide variety of colors can be used in marketing the sandals. In the preferred embodiment, the material used is a mixture of polyethylene in fairly high amounts (such as 75%) and about 25% of ethylene-vinyl-acetate.

Figure 9:
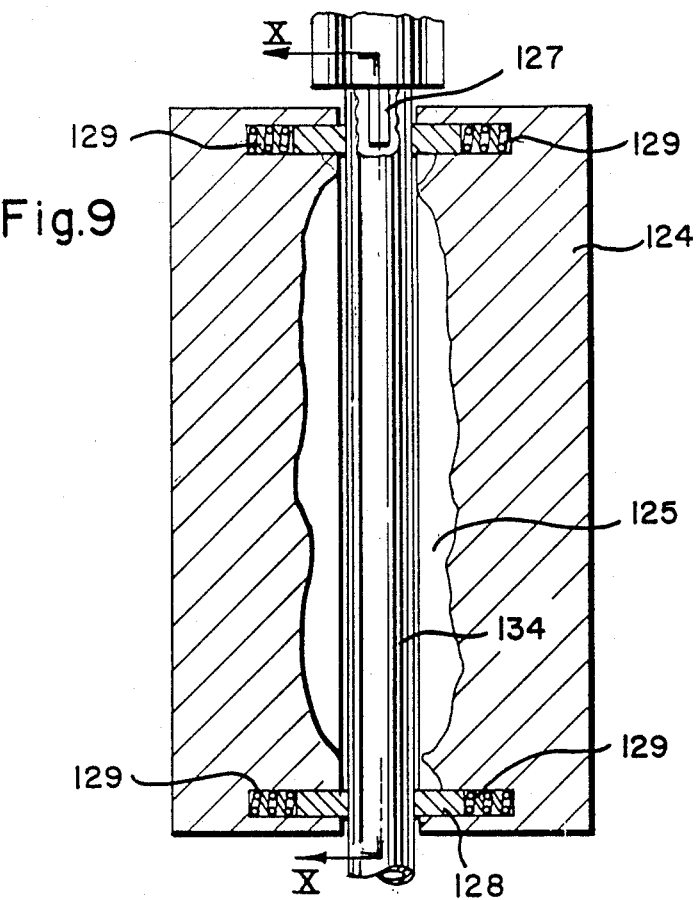
FIG. 9 is a vertical sectional view of a modification of the apparatus.
Figure 10:
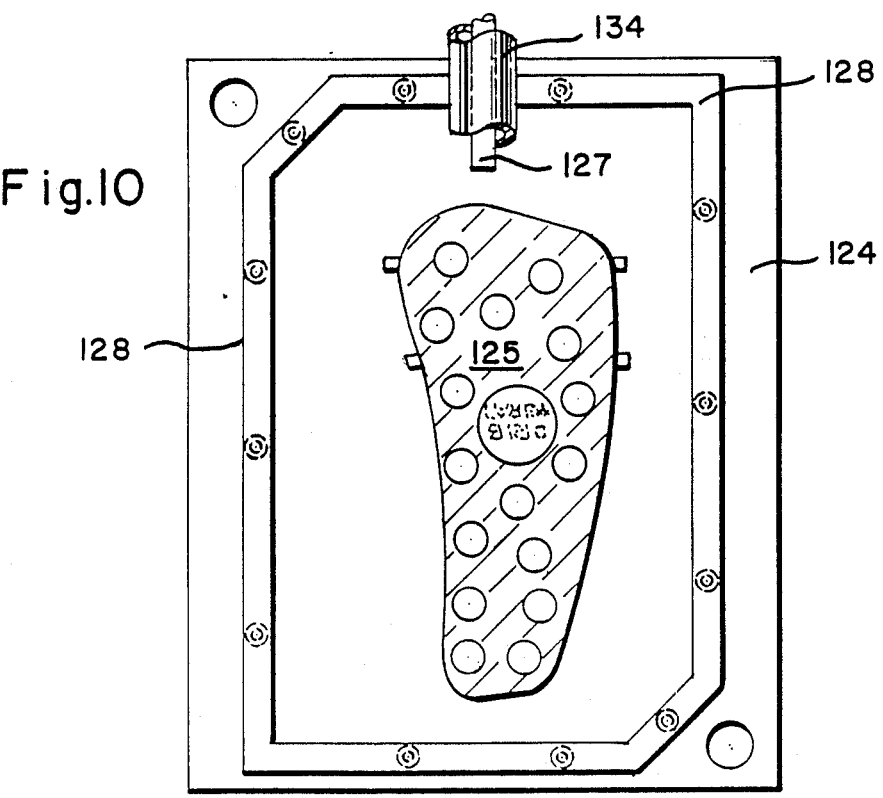
FIG. 10 is a vertical sectional view of the apparatus taken along the line X—X of FIG. 9.

FIGS. 9 and 10 show a modified form of the mold 124 in which the old cavity 125 is surrounded by a solid frame 128 on each old half. Each frame is resiliently loaded or pressed inwardly toward the parting line by springs 129. The blow pin 127 protrudes through the spring-loaded gate that is thus formed, but not far enough to reach the cavity. The parison 13 is drapped low enough to reach the bottom of the frame. As the mold closes, a preblow cycle of air pressure is sent through the parison 127 until the point is reached at which the two spring-loaded frames begin to seal, causing a pocket within the frame. Immediately thereafter, the mold closes and traps the air within the frame and the cavity. With this method, it is possible to obtain good consistency or duplication from piece to piece. It also regulates the amount of air pressure with the sole that is formed. The part leaves the mold is a finished sole with only the small flash to be removed.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by letters patent is:

1. Sandal sole, comprising:
   (a) a lower sole element formed with ground-gripping protuberances,
   (b) an upper sole element formed with foot-engaging depressions, and
   (c) an intermediate sole element joining the outer peripheries of the upper and lower sole elements in spaced, parallel relationship, the sole elements defining an interior cavity containing a gas under pressure, wherein the intermediate sole element is formed with upper and lower parts joined to form a bellows-like structure.

2. Sandal sole as recited in claim 1, wherein the sole elements are formed of an elastomer polymer.

3. Sandal sole as recited in claim 1, wherein the sole elements are formed by the blow-molding process.

4. Sandal sole as recited in claim 3, wherein the gas under pressure is introduced into the cavity during the blow-molding process.

* * * * *